Sept. 4, 1962  J. MARTIN  3,052,432
AIRCRAFT SEATS AND HARNESS FOR AIRMEN
Filed March 31, 1961  2 Sheets-Sheet 1
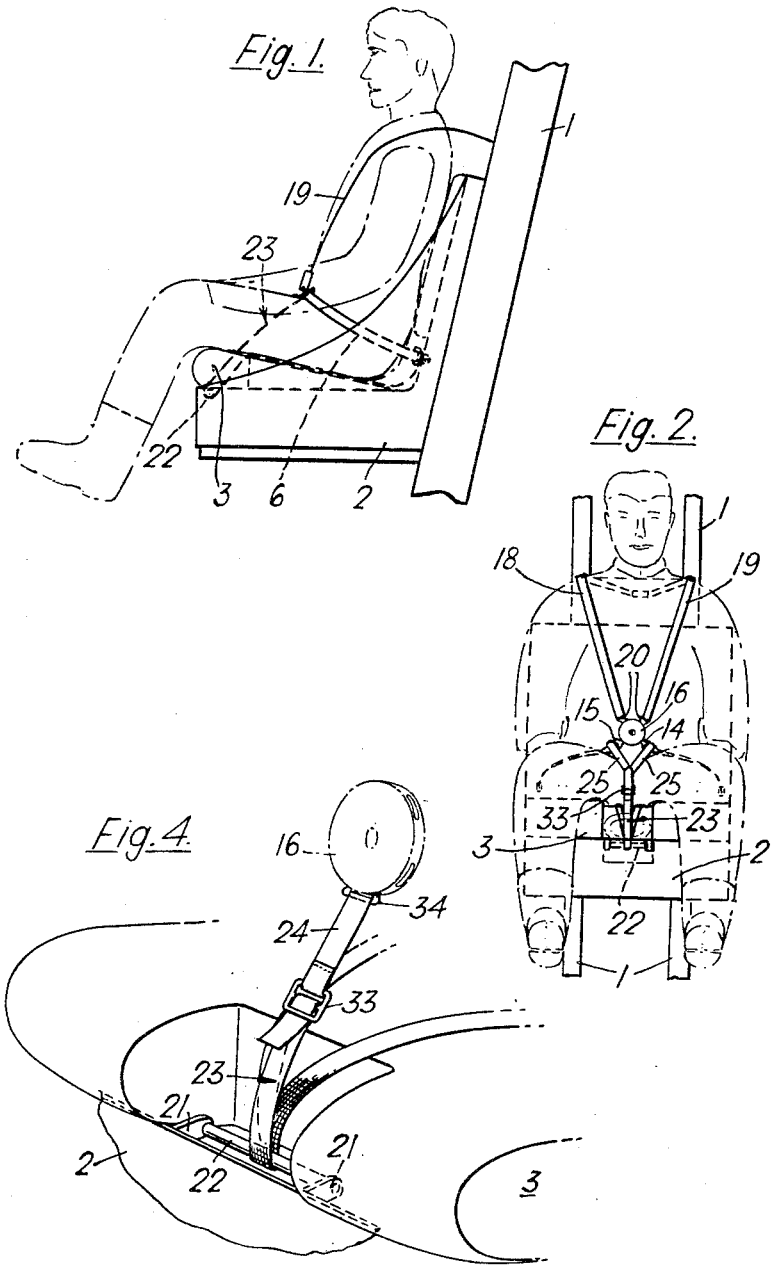

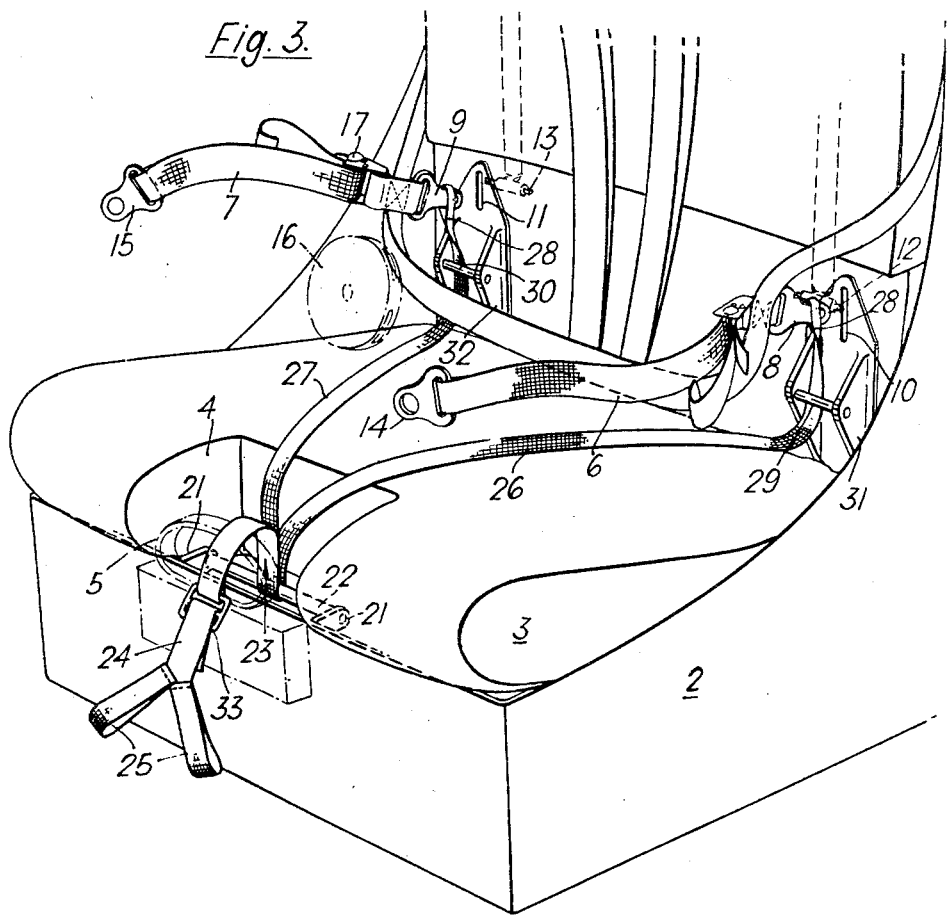

Patented Sept. 4, 1962

3,052,432
AIRCRAFT SEATS AND HARNESS FOR AIRMEN
James Martin, Southlands Manor, Southlands Road, Denham, near Uxbridge, England
Filed Mar. 31, 1961, Ser. No. 99,800
Claims priority, application Great Britain Apr. 6, 1960
4 Claims. (Cl. 244—122)

This invention concerns improvements in or relating to aircraft seats and harnesses for airmen and particularly harnesess, hereinafter called "seat harnesses," for retaining airmen firmly in their aircraft seats.

An airman's harness frequently comprises two principal parts which may be separate or combined, namely, one part which serves to connect the airman to his parachute and, where provided, his inflatable dinghy or survival pack, and the second part constituting the said "seat harness."

In describing the construction of harness according to this invention, it will, for the sake of clarity of description, be assumed that the various harness parts are occupying their intended positions about the person of an airman.

One of the difficulties which arises in the use of an airman's harness is that which results from the tendency for an airman to be displaced away from his seat cushion and/or parachute and/or survival pack (all hereinafter included in the term "seat cushion") as a result of inverted flight or where negative G-conditions prevail, there being a serious danger that on the airman being so displaced, the seat cushion will become displaced from the seat pan forwardly of the latter to such an extent that, in the case of a pilot's seat cushion, it may interfere with the movement of the control column of the aircraft in subsequent flying or that, in any case, the thrust of the airman will be transmited through the seat cushion to the front wall of the seat pan with the consequence that this may be disrupted and possibly torn and so present a marked danger to the safety of the airman, this being especially the case where the seat is an ejection seat and if ejection follows upon the said displacement of the seat cushion.

Considerable efforts have been expended in an endeavour to improve airmen seat harnesses in such a way that the aforementioned disadvantages of known harnesses will be reduced and the airman held firmly in his seat in an aircraft in the said adverse conditions but, so far as I am aware, no really successful solution to the problem has hithereto been achieved.

In an aircraft seat it is customary for lap straps to be provided and anchored at their rear ends to the seat pan low down in the latter, these lap straps passing in use upwardly and forwardly around the buttocks of the airman and over his thighs and then being anchored at their front ends directly or indirectly to a quick release device or box (hereinafter referred to as a "quick release box") usually situated in front of the airman in the region of his navel. In many instances, for example in the case of aircraft ejection seats with which this invention is especially concerned, the rear ends of the lap straps are releasably anchored to the rear of the seat pan and the airman's harness includes shoulder straps which pass upwardly from the quick release box and over the airman's shoulders before being connected releasably to the back of the seat at the upper part thereof, these shoulder straps frequently being also connected to the lift webs attached to the airman's parachute.

With any arrangement in which lap straps pass upwardly and forwardly from the lower part of the seat around the thighs and legs of the airman to be anchored directly or indirectly to a quick release box in front of the airman, there is still some freedom for the airman to move away from his seat cushion in inverted flight or during an ejection sequence or in other exceptional circumstances where negative G-conditions prevail, with the consequential dangers that have hereinbefore been explained, for it will be appreciated that the said lap straps do not exert a direct pull on the airman towards the base of the seat pan but exert a pull in a more or less diagonal manner from the region of the airman's navel to the lower part of the seat pan, so that the front ends of the lap straps may pivot or arc, for example as the aircraft is inverted, around the anchorages of the lap straps to the aircraft seat and so permit the airman to move away from his seat cushion. Moreover it is found in practice that airmen find it inconvenient and unpleasant to have the thrust of their bodies taken by shoulder straps when they are thrust away from their seat cushion during inverted flight and in other negative G flying conditons and it is therefore an object of this invention to provide a means to assist in holding an airman firmly in his seat in an aircraft.

According to this invention there is provided an aircraft seat having seat harness for holding an airman to such seat, such harness including a pair of lap straps attached at their rear ends to the rear of the seat pan of such seat and adapted to be connected at their front ends to a quick release box, and at least one retaining strap adapted for releasable anchorage at its front end to the front end portions of the said lap straps or to the said quick release box when the harness is in use, said retaining strap extending downwardly from its front end to and under guide means, provided on said seat pan at or near the front thereof, and then rearwardly to the back of the seat pan, means being provided for attaching the said retaining strap, at its rear, to the rear of said seat pan.

According to a further feature of the invention, the said retaining strap is releasably attached at the rear thereof to lock means provided at the rear of the seat pan.

The said retaining strap passes, in use, downwardly from the said quick release box, between the airman's legs and then under said guide means to the lock or equivalent means at the rear of the seat pan, the retaining strap forming with the lap straps a triangulated system whereby the airman is firmly held upon his seat cushion.

Conveniently the said guide means may comprise a roller, a tube or other suitable guide member fitted upon the front of the seat pan preferably on the inner side of such front.

The front end of the retaining strap may be releasably attached in use to one or both of the lap straps adjacent to the quick release box or it may be connected to the quick release box through the medium of a lug on the strap and adapted for engagement in such quick release box.

Desirably the retaining strap will fork after passing rearwardly through the said guide means so that the rearwardly extending part of the strap has two branches or limbs, each of these branches or limbs being provided with a loop or ring for the passage therethrough of the rear terminal lug of the lap strap of the seat harness on the corresponding side of the seat pan with the said loop or ring situated near the point of entry of this terminal lug into the lock or other anchorage point provided at the back of the aircraft seat.

Provision will preferably be provided to enable the rear ends of the retaining strap to be automatically released from the seat pan in an emergency, such as during ejection of the airman from an aircraft, and further means may be provided to enable such ends of the retaining strap to be manually released by the airman whenever he wishes.

Generally the rearwardly extending portion or portions of the retaining strap will pass rearwardly over the top of the airman's seat cushion so as to serve to retain the latter in the seat pan during inverted flying or other negative G-conditions and during ejection. However, the rearwardly extending portion or portions of the retaining strap could, if required, be carried underneath the airman's seat cushion.

The retaining strap may be furnished at a convenient position in its length with an adjustable buckle to enable the length of, and the tension in, this strap to be adjusted by the airman after he has positioned himself initially in his aircraft seat.

Further features of the invention will become apparent from the appended claims and the following description of one embodiment of the invention which is illustrated in the accompanying drawings in which:

FIGURE 1 is a diagrammatic side elevation of an aircraft ejection seat having this invention applied thereto and showing the parts of the seat harness relevant to this invention;

FIGURE 2 is a front elevation of the seat shown in FIGURE 1;

FIGURE 3 is a perspective view of the lower part of the seat pan diagrammatically illustrated in FIGURES 1 and 2 and shows the retaining strap arrangement according to this invention in a partially released condition; and FIGURE 4 shows a slight modification of the arrangement illustrated in FIGURE 3.

Referring to the drawings, 1 represents the main frame of an aircraft ejection seat, for example an aircraft ejection seat of the well known Martin-Baker type of which an example is described and illustrated in the Specification of my U.S. patent application No. 723,705. On the frame 1 is adjustably mounted a seat pan 2 in which is disposed the airman's seat cushion and/or seat type parachute and/or survival pack, illustrated diagrammatically at 3 and referred to herein as the "seat cushion." This cushion is furnished with a central recess 4 in its front edge to give ready access to the manually operated ejection seat firing handle 5 of known form.

The heat harness for holding the airman in the seat pan 2 is diagrammatically illustrated in FIGURES 1 and 2 and this seat harness may be formed separately of the airman's parachute harness or may alternatively form part of a combined seat and parachute harness as described, for example, in my U.S. Patent No. 2,655,329 or No. 2,857,123.

The seat harness comprises a pair of known lap straps 6 and 7, the rear ends of which are furnished with lugs 8 and 9 adapted to be respectively engaged in seat locks 10 and 11 provided at the lower rear part of the seat pan 2 as clearly shown in FIGURE 3, the seat locks conveniently being such as described in my U.S. patent application No. 723,705, these seat locks respectively having bolts 12 and 13 adapted to engage through holes in the ends of the lugs 8 and 9 to lock these in the seat locks, but the bolt being adapted to be automatically withdrawn during seat ejection in an emergency but also being capable of manual withdrawal when desired as described in the said patent application.

The front ends of the lap straps 6 and 7 are also each provided with an apertured terminal lug, these lugs being respectively marked 14 and 15 in the drawings and being adapted for engagement in the known manner in a quick release box 16 incorporated into the seat harness and occupying in use a position approximately opposite to the airman's navel, this release box being diagrammatically illustrated in the drawings and being of any usual form in which lugs such as 14 and 15, can be engaged but from which such lugs may rapidly be released by the airman when he so wishes, e.g. when desirous of leaving the aircraft in normal circumstances.

The lap straps 6 and 7 are adapted to pass in use upwardly from the locks 12 and 13 around the airman's buttocks and thighs and to be plugged into the quick release box 16, each of said lap straps being provided with an adjusting buckle 17 whereby the lap straps may be tightened up.

The seat harness also includes known shoulder straps 18 and 19, see FIGURES 1 and 2, which have at their lower front ends lugs 20 adapted releasably to engage in the quick release box 16, the straps passing upwardly and over the airman's shoulders and being anchored to the seat frame at their upper rear ends preferably through the medium of a forward reach mechanism such as described, for example, in the said U.S. patent application No. 723,705.

When an airman sitting in the seat and held therein by seat harness such as above described is subjected to negative G— or is in inverted flight, there is a tendency for the lap straps 6 and 7 to pivot about their rear ends where they are anchored to the locks 10 and 11 so that it is possible for the airman to move away from the base of the seat pan and for the seat cushion to become displaced forwardly with respect to the seat pan as hereinbefore described.

It will be appreciated that negative G— conditions may be encountered in straight and level flight according to speed, altitude and the terrain over which the aircraft is flying. This may be particularly noticeable when flying at high speed and low altitude when bumpy conditions are frequently encountered.

In applying this invention to an ejection seat of the known form above described the transverse front wall of the seat pan 2 is furnished on the inside thereof and at its upper part with a pair of rearwardly projecting brackets 21 spaced symmetrically about the fore and after axis of the seat and between these rearwardly projecting lugs is arranged a guide member 22 in the form of a tube, rod, roller or the like over which a retaining or negative G— strap 23 is adapted to pass as hereinafter described, and which guide member is parallel to the front wall of the seat pan.

The retaining strap 23 shown is of Y-shape having the stem portion 24 thereof adapted for releasable connection to the front end portions of the lap straps 6 and 7 of the seat harness or for direct connection to the quick release box 16 as hereinafter described.

In the embodiment of the invention shown in FIGURES 1 and 3 the front upper end of the stem 24 of the strap 23 is furnished with two divergent loops 25 through which the front ends of the lap straps 6 and 7 are respectively adapted to be threaded (as shown in FIGURE 2) preparatory to the lugs 14 and 15 at the front ends of these lap straps being inserted into the quick release box 16.

Each of the two divergent limbs 26 and 27 of the retaining or negative G— strap 23 is provided at its rear end with a loop or ring 28 for the passage therethrough of the terminal lug 8 or 9 of the corresponding lap strap 6 or 7 of the seat harness, the loops or rings 28 being threaded on to the terminal lugs 8 and 9 of the lap straps 6 and 7 preparatory to these lugs being plugged into their respective locks 10 and 11 on the seat pan and the lugs 8 and 9 being wider at their front ends than the internal size of the said loops or rings so that when the terminal lugs 8 and 9 are plugged into the seat pan locks 10 and 11, the arms 26 and 27 of the Y-shaped retaining strap are securely anchored to the seat pan.

In use the stem 24 of the retaining or negative G— strap 23 passes downwardly away from the pick release box 16 under the guide member 22 and rearwardly over the top of the seat cushion 3 in the seat pan 2 and the divergent arms 26 and 27 of the strap 23 then respectively pass under transverse guide members, e.g. pins or rollers, 29 and 30 carried in brackets 31 and 32 respectively forming parts of or accessories to the seat locks 10 and 11, the rear ends of the limbs 26 and 27 of the retaining or negative G— strap then passing upwardly and being engaged with the lugs 8 and 9 of the lap straps 6 and 7 before the lugs 8 and 9 are inserted in the locks 10 and 11 as above described.

The operative position of the retaining or negative G— strap 23 and parts thereof is diagrammatically illustrated in FIGURES 1 and 2.

In order that the retaining or negative G— strap 23 may be placed in adequate tension it is furnished with a length adjusting buckle 33.

In the alternative arrangement shown in FIGURE 4 of the drawings the upper end of the stem portion 24 of the Y-shaped retaining or negative G— strap 23 is furnished with a lug 34 replacing the loops 25 and adapted for plugging directly into the conventional quick release box 16.

It will be appreciated that when the lap straps 6 and 7 have been properly fastened and the retaining or negative G— strap 23 has been attached at its rear ends to the seat and at its front end to the front ends of the lap straps of the seat harness or to the quick release box and appropriately tightened by means of the adjusting buckle 33, the strap 23 serves to prevent, during inverted flight for example, the normal tendency of the quick release box to arc away from the seat pan about the points of attachment of the lap straps 6 and 7 to the locks 10 and 11 on the seat pan so that the freedom for the airman to move away from his seat cushion as hitherto is eliminated or reduced whilst, at the same time, any tension placed on the strap 23 due to the tendency of the airman to move away from his seat cushion serves to tension the two limbs 26, 27 of the strap that extend over the seat cushion so as firmly to hold this in its normal position in the seat pan.

It will be appreciated that the front upper end of the retaining or negative G— strap 23 will be readily releasable from the quick release box when required by manual operation of this box, whilst in an emergency the rear ends of the strap will be automatically released from the back of the seat pan with the release of the lap straps 6 and 7, the terminal lugs 8 and 9 of which will then leave the loops or rings 28 at the rear ends of the retaining strap branches or limbs 26 and 27.

Although it is preferred to take the retaining strap 23 over the cushion 3, there may be instances where it will be desirable for one reason or another to take the retaining strap below the seat cushion: in such a case the guide members 22, 29 and 30 will be located at the appropriate lower levels on the seat pan.

It will be appreciated that the rear ends of the retaining or negative G— strap 23 may be manually released from the lugs 8 and 9 of the lap straps by disengaging these lugs from the locks 10 and 11 by operating manual control mechanism provided for withdrawing the bolts 12 and 13 as described, for example, in the said U.S. patent application No. 723,705.

I claim:

1. In an aircraft ejection seat, the combination of a seat pan guide means positioned near the front of said pan, a releasable attachment on each side of said pan and positioned at the rear of said pan, a seat harness for holding an airman to said seat, said harness comprising a pair of lap straps adapted to be releasably connected at their rear ends to said releasable attachments, a quick release box for releasably securing the front ends of said lap straps and at least one retaining strap adapted for releasable connection at its front end to the front ends of said lap straps and extending from such connection downwardly to and under said guide means and then rearwardly to the back of said seat pan to be releasably connected thereto by said releasable attachments, whereby said operation of said releasable attachments to release the rear ends of said lap straps effects simultaneous release of the rear end of said retaining strap.

2. An air craft seat according to claim 1 in which the front end of said retaining strap is provided with a pair of loops, the front end portion of each of said lap straps passing through one of said loops.

3. An aircraft seat according to claim 1 in which the front end of said retaining strap is provided with a lug for direct releasable connection to said quick release box.

4. An aircraft seat according to claim 1 in which said retaining strap is forked to provide a pair of divergent branches rearwardly of said guide means on the front of said seat pan.

References Cited in the file of this patent

UNITED STATES PATENTS 2,892,602    Servanty _____ June 30, 1959